(12) United States Patent
Tarleton et al.

(10) Patent No.: US 7,512,464 B2
(45) Date of Patent: Mar. 31, 2009

(54) SYSTEM AND METHOD FOR CONTROLLING THE SPEED OF AN AIRCRAFT

(75) Inventors: Tom Tarleton, Woodinville, WA (US); Jason Koszola, Lynnwood, WA (US); Peter D. Gunn, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 623 days.

(21) Appl. No.: 11/317,525

(22) Filed: Dec. 22, 2005

(65) Prior Publication Data

US 2008/0300736 A1 Dec. 4, 2008

(51) Int. Cl.
*G05D 1/06* (2006.01)
*G01C 23/00* (2006.01)
*G06F 19/00* (2006.01)

(52) U.S. Cl. .................. 701/3; 701/9; 701/14; 701/18; 244/182; 340/969

(58) Field of Classification Search .................. 701/3, 701/7, 9, 10, 14, 18, 300, 11; 340/969, 978, 340/979; 244/75.1, 175, 178, 182, 186, 221, 244/17.13

See application file for complete search history.

(56) References Cited

U.S. PATENT DOCUMENTS

| 4,467,429 A * | 8/1984 | Kendig ........................ 701/3 |
| 4,811,230 A | 3/1989 | Graham et al. .............. 364/428 |
| 6,334,344 B1* | 1/2002 | Bonhoure et al. .............. 70/11 |
| 2005/0004721 A1* | 1/2005 | Einthoven et al. .............. 701/4 |
| 2006/0138277 A1* | 6/2006 | Franceschini et al. .... 244/17.13 |

* cited by examiner

*Primary Examiner*—Tan Q Nguyen
(74) *Attorney, Agent, or Firm*—Wildman, Harrold, Allen & Dixon, LLP (57) ABSTRACT

A system and method are disclosed for controlling the speed of an aircraft having a preprogrammed speed profile when transitioning from a manually set target speed to the preprogrammed speed profile. In operation, an input is received indicating that a user desires to transition from a manually set target speed to the preprogrammed speed profile. A determination is then made as to whether the manually set target speed satisfies one or more selected conditions for qualifying as a constraint speed of the preprogrammed speed profile. If the manually set target speed satisfies the one or more selected conditions, the preprogrammed speed profile is updated to include the manually set target speed as a constraint speed and the speed of the aircraft is controlled using the updated speed profile.

22 Claims, 6 Drawing Sheets

SYSTEM AND METHOD FOR CONTROLLING THE SPEED OF AN AIRCRAFT

BACKGROUND

The present application is directed to a method of controlling the speed of an aircraft, and more particularly to a method for controlling the speed of an aircraft having a preprogrammed speed profile when transitioning from a manually set target speed to the preprogrammed speed profile.

Modern jet transports are equipped with a cockpit mode control panel that interfaces with a flight management system to control the selection and engagement of automatic flight control modes of operation. These automatic flight control modes of operation include, for example, flight level change (FLCH), vertical navigation (VNAV) and lateral navigation (LNAV). The FLCH mode can automatically manage thrust and speed to climb or descend from one altitude to another. The VNAV mode can provide automatic optimized profile control from initial climb through final approach, including adherence to terminal area procedure speed and altitude constraints. The LNAV mode can provide steering to a preprogrammed route including selected terminal area procedures.

The pilot chooses the available modes that will best accomplish the desired vertical flight profile and lateral routing. In most instances, the pilot plans the flight in advance, both laterally and vertically, and preprograms the LNAV and VNAV modes so that the desired flight path will be followed. While preprogrammed flights are advantageous because they reduce the pilot's burden, particularly during takeoff and landing, in practice, rarely can flights be flown as preplanned. For example, rerouting and clearance instructions may be received from air traffic control (ATC) during the flight. These instructions force the pilot to depart from the vertical flight profile and/or the lateral route that was originally planned. In some instances, rerouting and reclearance come far enough in advance to allow the pilot to reprogram the route or profile instructions stored in the memory of a flight management computer so that the flight management system can remain in the LNAV and VNAV flight control modes. On other occasions, pilots are forced to manually intervene in order to depart from LNAV and VNAV preprogrammed flight paths and comply with ATC instructions in a timely manner.

Intervention-capable flight management systems (FMS) have been developed which allow a pilot to intervene in the operation of the preprogrammed flight management computer of a flight management system and change the speed and/or flight path of an aircraft in response to air traffic control (ATC) instructions. One such system is disclosed in U.S. Pat. No. 4,811,230, issued to Graham on Mar. 7, 1989 and entitled "Intervention Flight Management System," the disclosure of which is hereby incorporated by reference in its entirety.

The intervention FMS disclosed in the Graham patent includes a mode control panel via which the pilot interfaces with an FMS program. The FMS program includes several modules that override the preprogrammed instructions stored in the memory of the flight management computer when the modules are engaged. In this manner, the FMS allows the pilot to manually intervene and control the flight management computer and, thus, the aircraft in response to, for example, ATC instructions to change heading, altitude, airspeed or vertical speed. The FMS automatically returns to fully optimized flight along the preprogrammed profile when the intervention is cancelled.

Under certain conditions, returning to the preprogrammed profile after the intervention is cancelled has been known to cause problems. For example, when in descent, ATC instructions often require a slower speed than the VNAV preprogrammed profile speed, causing the pilot to intervene using the FMS to manually set a slower target speed. Upon completing the ATC procedure, the pilot may wish to exit speed intervention, and return to the VNAV preprogrammed profile. In this scenario, it is often the case that the scheduled VNAV profile speed remains higher than the manually set target speed. If so, the flight control computer will signal an increase in thrust from the engines, causing an increase in the speed of the aircraft as the computer attempts to return the aircraft to the scheduled VNAV profile speed. This increase in speed is generally undesirable during descent, when a reduction in speed is typically necessary in order to eventually reach the desired landing speed. The speed increase wastes fuel, can cause potential safety issues, and can result in additional work for the pilot, who may attempt to manually adjust the throttle of the aircraft to avoid the speed increase.

BRIEF DESCRIPTION

The above-mentioned drawbacks associated with existing methods of controlling the speed of an aircraft are addressed by embodiments of the present invention, which will be understood by reading and studying the following specification.

In one embodiment, a method is disclosed for controlling the speed of an aircraft having a preprogrammed speed profile when transitioning from a manually set target speed to the preprogrammed speed profile. The method comprises receiving an input indicating that a user desires to transition from a manually set target speed to the preprogrammed speed profile and determining whether the manually set target speed satisfies one or more selected conditions for qualifying as a constraint speed of the preprogrammed speed profile. If the manually set target speed satisfies the one or more selected conditions, the preprogrammed speed profile is updated to include the manually set target speed as a constraint speed and the speed of the aircraft is controlled using the updated speed profile.

In another embodiment a machine-readable medium comprises machine-readable instructions for causing a computer to perform a method for controlling the speed of an aircraft having a preprogrammed speed profile when transitioning from a manually set target speed to the preprogrammed speed profile. The method comprises receiving an input indicating that a user desires to transition from a manually set target speed to the preprogrammed speed profile and determining whether the manually set target speed satisfies one or more selected conditions for qualifying as a constraint speed of the preprogrammed speed profile. If the manually set target speed satisfies the one or more selected conditions, the preprogrammed speed profile is updated to include the manually set target speed as a constraint speed and the speed of the aircraft is controlled using the updated speed profile.

In another embodiment, an aircraft comprises an FMS mode control panel and a flight management computer comprising a speed transition module for controlling the speed of an aircraft having a preprogrammed speed profile when transitioning from a manually set target speed to the preprogrammed speed profile. The speed transition module is configured to receive an input indicating that a user desires to transition from a manually set target speed to the preprogrammed speed profile and determine whether the manually set target speed satisfies one or more selected conditions for qualifying as a constraint speed of the preprogrammed speed profile. If the manually set target speed satisfies the one or more selected conditions, the preprogrammed speed profile is updated to include the manually set target speed as a constraint speed and the speed of the aircraft is controlled using the updated speed profile.

These and other embodiments of the present application will be discussed more fully in the detailed description. The features, functions, and advantages can be achieved independently in various embodiments of the present application, or may be combined in yet other embodiments.

DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
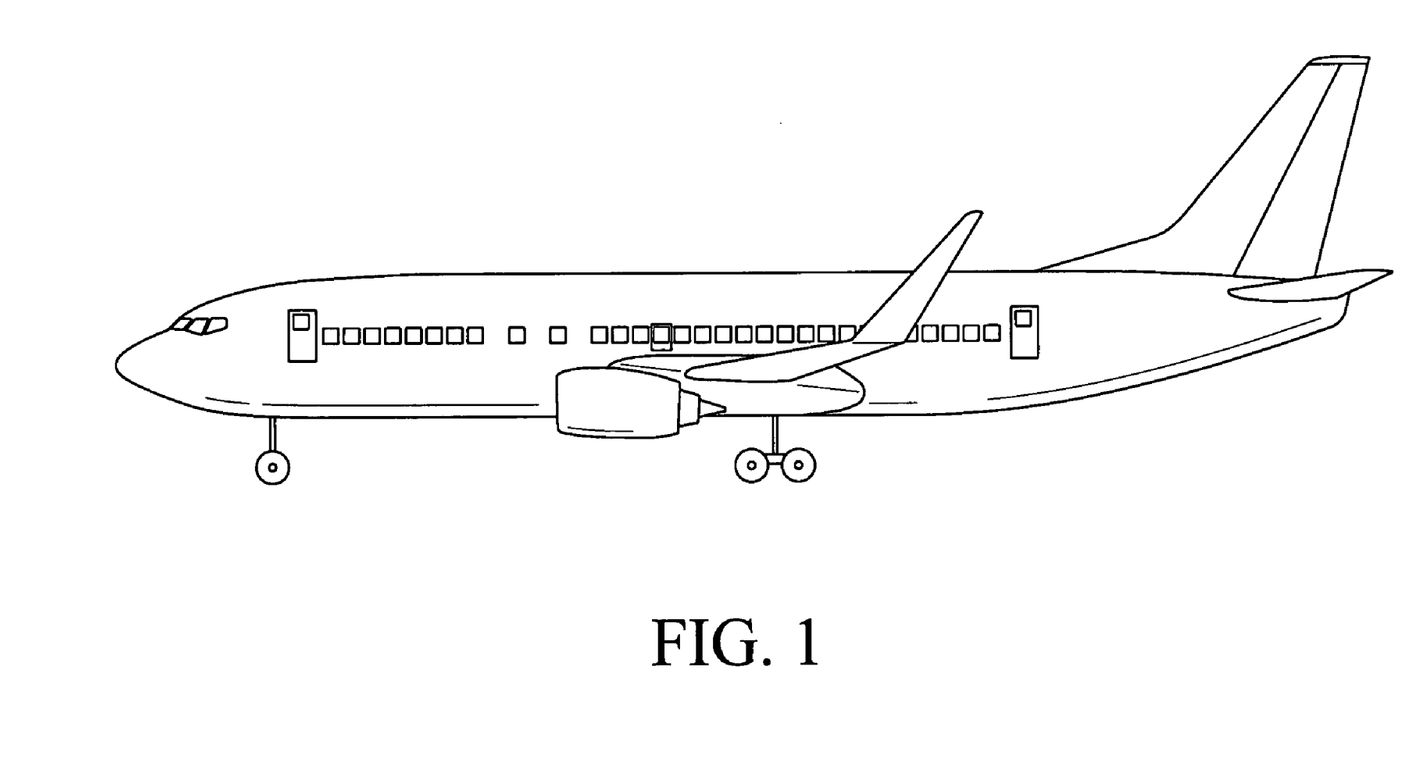
FIG. 1 illustrates one example of an aircraft, which may employ a flight management system, according to an embodiment of the present application.
Figure 2:
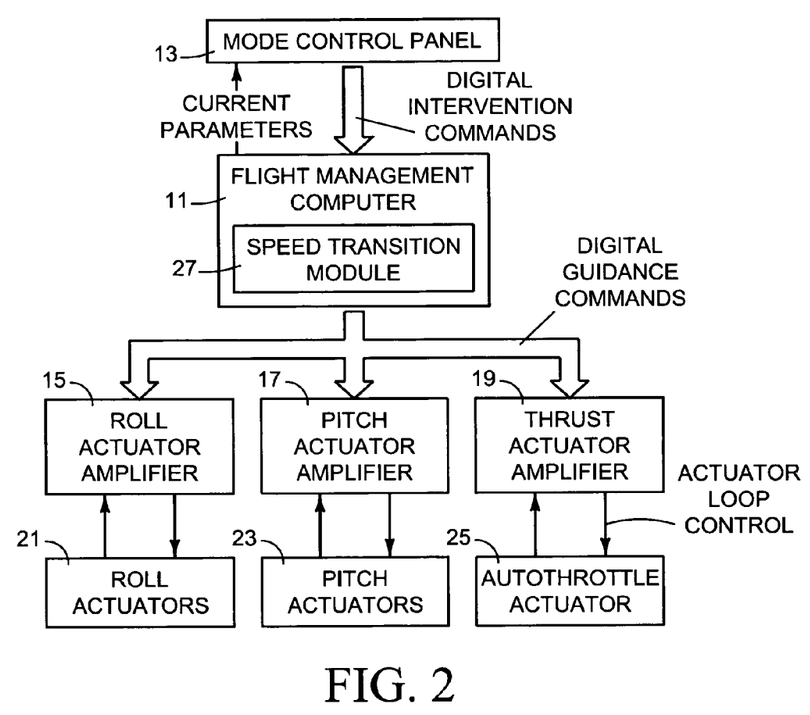
FIG. 2 is a block diagram illustrating an intervention flight management system (FMS), according to one embodiment of the present application.

Modern aircraft, such as the airliner illustrated in FIG. 1, may employ a flight management system (FMS). FIG. 2 is a block diagram illustrating one example of an intervention FMS formed in accordance with one embodiment of the present application. More specifically, the FMS of the embodiment of FIG. 2 comprises: a flight management computer 11; mode control panel 13; roll, pitch and thrust actuator amplifiers 15, 17 and 19; and roll, pitch and autothrottle control actuators 21, 23 and 25. The control actuators 21, 23 and 25 may comprise any suitable actuators for controlling the roll, pitch and autothrottle of an aircraft, such as, for example, servos, fly-by-wire (FBW) actuators, etc.

The embodiment of FIG. 2 shows the mode control panel 13 as transmitting digital intervention commands to the flight management computer 11 and receiving current parameter signals from the flight management computer 11. In another embodiment, the flight management computer 11 periodically interrogates the status of knobs and switches forming part of the mode control panel 13 and uses the resultant information to engage, disengage and control paths through the modules of an FMS program stored in the flight management computer 11, along with programs that create other automatic flight control modes, such as LNAV and VNAV flight control modes.

In the illustrated embodiment, based on preprogrammed instructions and/or intervention commands, the flight management computer 11 produces digital guidance commands, which are applied to the roll, pitch and thrust actuator amplifiers 15, 17 and 19. In accordance with the digital guidance commands, the roll, pitch and thrust actuator amplifiers 15, 17 and 19 generate signals that are applied to the roll, pitch and autothrottle actuators 21, 23 and 25, respectively. The roll, pitch and autothrottle actuators 21, 23 and 25 produce feedback actuator position signals that are applied to the roll, pitch and thrust actuator amplifiers 15, 17 and 19. As a result, actuator loop control systems are formed between the roll actuator amplifier 15 and roll actuators 21, between the pitch actuator amplifier 17 and the pitch actuators 23 and between the thrust actuator amplifier 19 and the autothrottle actuator 25.

Thus, the digital guidance commands produced by the flight management computer 11 control the orientation and speed of the aircraft. In this regard, it is to be understood that FIG. 2 is a simplified block version of a sophisticated system for controlling the orientation and speed of an aircraft. The present application is directed to the FMS, and more particularly to a speed transition module 27 which operates on flight management computer 11, and which will be described in greater detail below. Accordingly, details of how the flight management computer 11 controls the orientation and speed of an aircraft using the actuator amplifiers 15, 17, 19 and actuators 21, 23, 25 are not described here.

The mode control panel 13 allows a user, such as a pilot of the aircraft, to interface with the FMS. The mode control panel 13 may include a number of different sections, such as a direction section, altitude section, speed section and vertical path section, for allowing the pilot to control various functions of the FMS. One example of such a mode control panel is described in U.S. Pat. No. 4,811,230, issued to Graham and entitled "Intervention Flight Management System," the description of which intervention FMS control panel is hereby incorporated by reference in its entirety.

Figure 3:
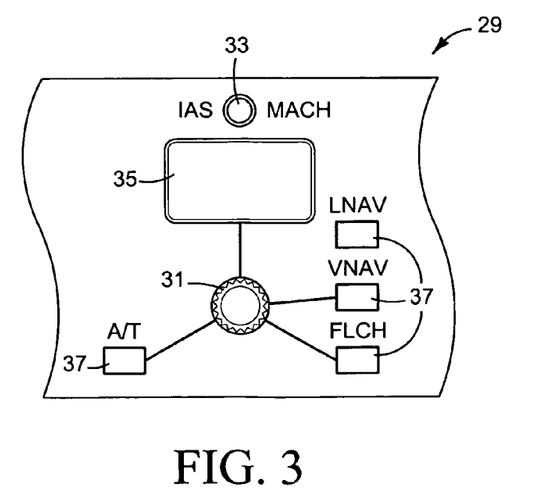
FIG. 3 illustrates a speed section of a mode control panel, according to one embodiment of the present application.

FIG. 3 illustrates one embodiment of a speed section 29 of mode control panel 13. The illustrated embodiment of speed section 29 includes: speed knob/selection button 31; indicated airspeed (IAS)/MACH select switch 33; a display window 35 and mode selection buttons 37 with mode active indicator lights. In operation, the mode selection buttons 37 can be pressed to engage a particular mode of guidance and can illuminate to indicate that the selected mode is active. In addition, the IAS/MACH select switch 33 allows the pilot to choose between IAS and MACH modes of operation.

A speed intervention module is engaged by pressing speed knob/selection button 31. The term "module" as used herein, may refer to any combination of software, firmware, or hardware used to perform the specified function or functions. It is contemplated that the functions performed by the modules described herein may be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof. Additionally, the described modules may reside at different locations connected through a wired or wireless telecommunications network, or the Internet.

When speed knob/selection button 31 is pressed, the speed intervention module is synchronized to the current aircraft speed. Thereafter the speed of the aircraft is increased or decreased by rotating speed knob/selection button 31. Pressing speed knob/selection button 31 a second time exits the speed intervention mode of operation and engages speed transition module 27 for returning control of the aircraft to the preprogrammed speed profile, such as, for example, a VNAV speed profile stored in the flight management computer 11.

Referring again to FIG. 2, speed transition module 27 operates on flight management computer 11, and is engaged during flight when transitioning from a manually set target speed selected using the FMS to a preprogrammed speed profile. In some embodiments, speed transition module 27 comprises a set of instructions for determining whether the manually set target speed selected by the pilot using the FMS meets one or more selected conditions for qualifying as a constraint speed of the preprogrammed speed profile.

In one embodiment, if the one or more selected conditions for choosing the manually set target speed as a constraint speed are satisfied, speed transition module 27 updates the preprogrammed speed profile to include the manually set target speed as a constraint speed. The aircraft may then be controlled using the updated speed profile. If the selected conditions are not met, the manually set target speed is not set as a constraint speed, and module 27 instructs flight management computer 11 to control the aircraft's speed to the scheduled profile speed of the preprogrammed speed profile.

The selected conditions for determining if a manually set target speed qualifies as a constraint speed may be any suitable conditions which can logically determine whether or not a manually set target speed is an appropriate constraint speed for a given preprogrammed speed profile. In one embodiment, the conditions may be selected so that the manually set target speed is compared with a scheduled profile speed of the preprogrammed speed profile to determine if the manually set target speed is a more optimum constraint speed than the scheduled profile speed. For example, the manually set target speed may be selected if it requires less acceleration or deceleration, uses less fuel, or provides a safer speed profile than the scheduled profile speed.

Figure 5:
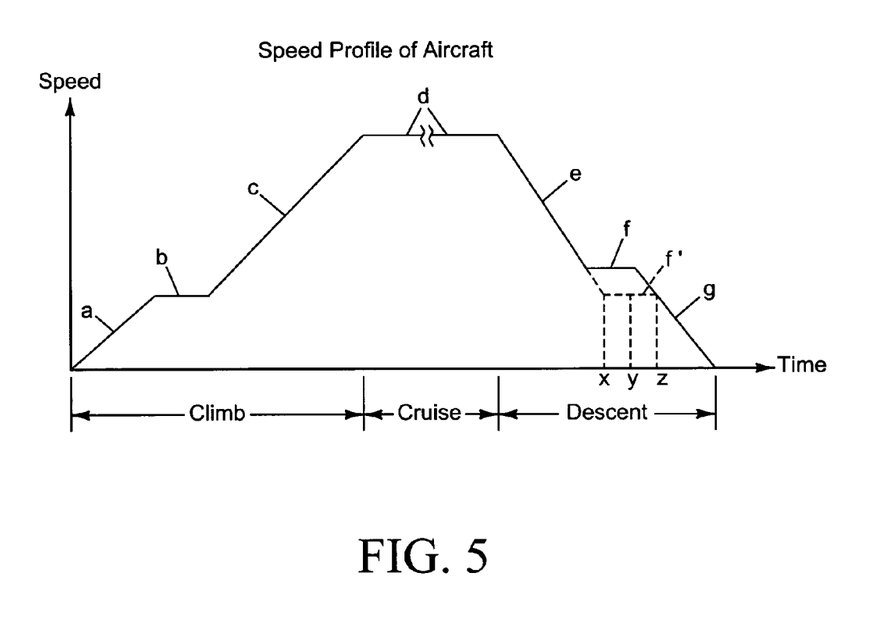
FIG. 5 illustrates a simplified preprogrammed speed profile for a flight path of an aircraft, according to one embodiment of the present application.

The selected conditions for determining whether the manually set target speed qualifies as a constraint speed of the preprogrammed speed profile may depend on the flight path segment in which the aircraft is flying at the time the determination is made. FIG. 5 illustrates a simplified preprogrammed speed profile for a flight path of an aircraft. In the illustrated embodiment, the flight path comprises a climb segment, cruise segment, and a descent segment, where the preprogrammed speed profile monotonically increases during the climb segment, levels off at a desired cruise speed, and then monotonically decreases during the descent segment. By monotonically, it is meant that there are a series of successive speed increases or successive speed decreases, without substantial oscillation in the relative value of the speed during the segment.

Speed increases during the climb segment and speed decreases during the descent segment may be limited by certain constraint speeds. Such constraint speeds are often set by law for aircraft flying below a certain elevation, such as, for example, a law requiring a plane to fly at 250 knots or less under 10,000 feet. Such a constraint speed would limit the climb speed to 250 knots or less at elevations of 10,000 feet or below during climb and descent segments. Thus, during the climb segment, as illustrated in FIG. 5, the aircraft may accelerate to a speed of 250 knots during portion a, then maintain a constant speed of 250 knots during portion b, until the aircraft reaches 10,000 feet. At that point, the aircraft may begin to accelerate again during portion c of the climb segment. During the descent segment, the aircraft may decrease speed during a portion e in order to comply with the constraint speed of 250 knots at 10,000 ft, then maintain the 250 knots for a period of time during portion f of the speed profile, before reducing speed again during portion g, as the aircraft begins final approach.

The preprogrammed speed profile of FIG. 5 is a simplified profile for illustrative purposes. An actual preprogrammed speed profile may contain any number of suitable constraint speeds. For example, in addition to constraint speeds imposed by law, there may be other constraint speeds imposed for achieving a desired purpose, such as to optimize fuel use during the flight and/or to optimize flight time, or for safety purposes. In some embodiments, constraint speeds are stored in a database as constants, which can be changed if, for example, air traffic regulations change. In addition, certain users, such as airline administrators, can select customized constraint speeds. Constraint speeds may be applied during any segment of the flight path. For example, while the embodiment of FIG. 5 illustrates a constant cruise speed, constraint speeds may cause preprogrammed changes in speed during the cruise segment.

Figure 4:
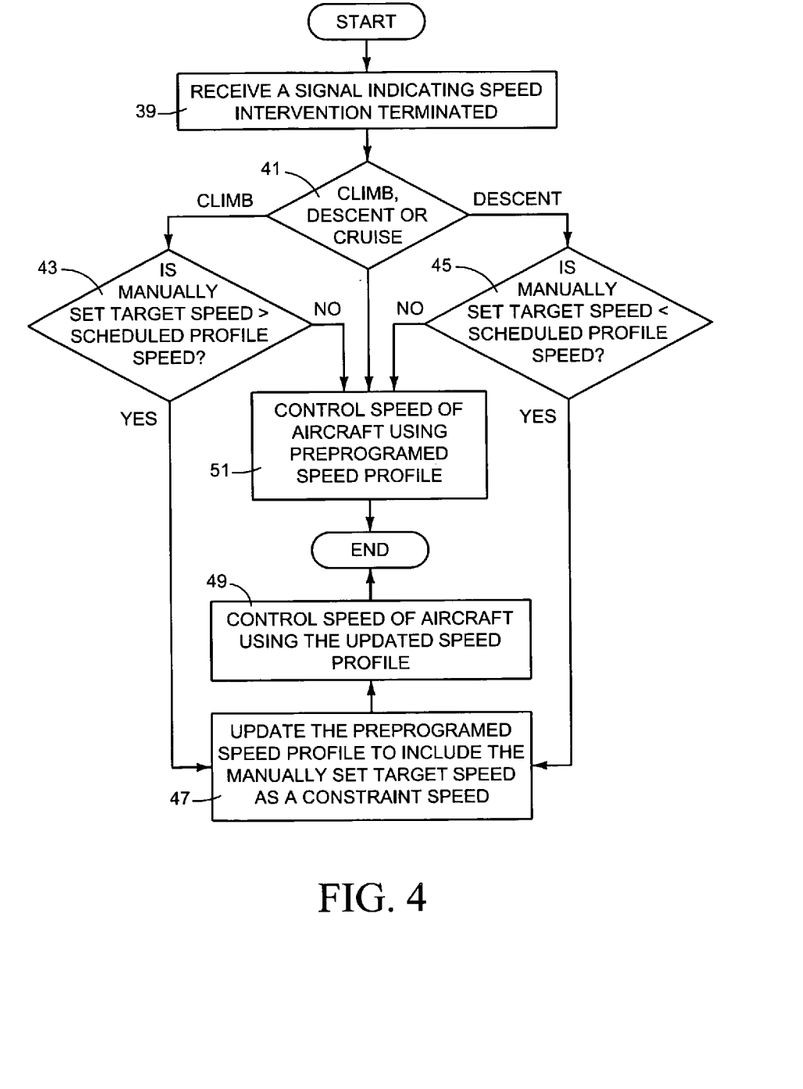
FIG. 4 illustrates a flow chart of a method performed by a speed transition module, according to one embodiment of the present application.

One example of a method performed by the speed transition module 27 is illustrated in the flowchart of FIG. 4. As indicated in block 39, speed transition module 27 is initiated when flight management computer 11 receives an input indicating that a user desires to terminate speed intervention mode and transition from a manually set target speed to the preprogrammed speed profile. This input may be received when the pilot presses speed knob/selection button 31 a second time, as discussed above.

In the illustrated embodiment, speed transition module 27 determines in decision block 41 the flight segment of the preprogrammed flight path in which the aircraft is currently flying. In this embodiment, there are three potential flight segments: climb, descent, and cruise. If speed transition module 27 determines that the aircraft is in the cruise segment, module 27 instructs flight management computer 11 to control the aircraft's speed to the scheduled profile speed, and the speed of the aircraft is thereafter controlled using the preprogrammed speed profile, as shown in block 51.

If, in decision block 41, it is determined that the aircraft is in a climb segment, speed transition module 27 of the FIG. 4 embodiment next determines if the manually set target speed is greater than a scheduled profile speed of the preprogrammed speed profile, as shown in decision block 43. If it is determined that the manually set target speed is greater than the scheduled profile speed, then the manually set target speed qualifies as a constraint speed, and the preprogrammed speed profile is updated to include the manually set target speed as a constraint speed, as indicated in block 47. If it is determined that the manually set target speed is not greater than the scheduled profile speed, then the manually set target speed does not qualify as a constraint speed. Instead, module 27 instructs flight management computer 11 to control the aircraft's speed using the preprogrammed speed profile, as indicated in block 51.

Referring again to decision block 41, if it is determined that the aircraft is in a descent segment, speed transition module 27 of the FIG. 4 embodiment next determines if the manually set target speed is less than a scheduled profile speed of the preprogrammed speed profile, as indicated in decision block

45. If the manually set target speed is less than the scheduled profile speed, then the manually set target speed qualifies as a constraint speed, and the preprogrammed speed profile is updated to include the manually set target speed as a constraint speed, as indicated in block 47. If the manually set target speed is not less than the scheduled profile speed, then the manually set target speed does not qualify as a constraint speed. Instead, module 27 instructs flight management computer 11 to control the aircraft's speed using the preprogrammed speed profile, as indicated in block 51.

If the one or more selected conditions are met, and the manually set target speed is chosen as a constraint speed, the manually set target speed may then operate as a constraint speed until it no longer qualifies as a constraint speed according to the preprogrammed speed profile. In the illustrated embodiment, this is accomplished by updating the preprogrammed speed profile to include the manually set target speed as a constraint speed, as indicated in block 47. The preprogrammed speed profile may be updated in any suitable manner.

For example, in some embodiments, flight management computer 11 uses predictions and assumptions to preprogram a flight profile, and it continually updates the remaining flight profile based on current parameters. Thus, if the preprogrammed speed profile is changed to include a pilot-entered constraint speed, the rest of the profile may have to change to meet other constraints, and the profile can be updated as required. Accordingly, speed transition module 27 may signal the flight management computer 11 to engage a speed profile computation module, which computes all or a portion of the remaining speed profile with the manually set target speed entered as a constraint speed. The speed of the aircraft may then be controlled using the updated speed profile, as shown in block 49.

Figure 6A:
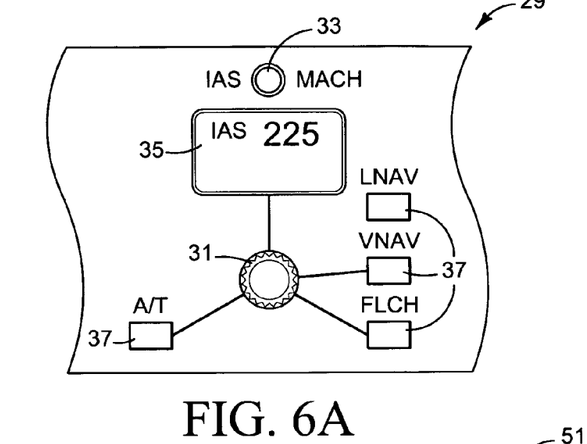
FIGS. 6A to 6C illustrate a speed section of a mode control panel after a pilot has intervened using an FMS, and associated screen shots of a progress page and VNAV page, according to one embodiment of the present application.

One exemplary embodiment incorporating speed transition module 27 of the FIG. 4 embodiment will now be described with reference to FIGS. 5, 6 and 7. As discussed above, FIG. 5 illustrates one example of a preprogrammed speed profile. During the descent segment of the preprogrammed speed profile, the aircraft is scheduled to decrease in speed during portion e, and then fly for a time at a constant speed of, in the present example, 240 knots, during portion f, before further decreasing speed during portion g, in preparation for landing. However, as is often the case, ATC may request that the aircraft enter a flight pattern requiring a lower speed, which in the present example is 225 knots or less, thereby requiring the pilot to intervene to fly at the lower speed, as illustrated by portion f', in FIG. 5. As discussed above, the pilot may intervene by pressing speed knob/selection button 31 on mode control panel 13, and then rotating speed knob/selection button 31 to manually set a speed target of 225 knots, as illustrated in window 35 of FIG. 6A. Flight management computer 11 then controls the aircraft to the manually set target speed of 225 knots, as indicated at point x along portion f' of the speed profile illustrated in FIG. 5.

Figure 6B:
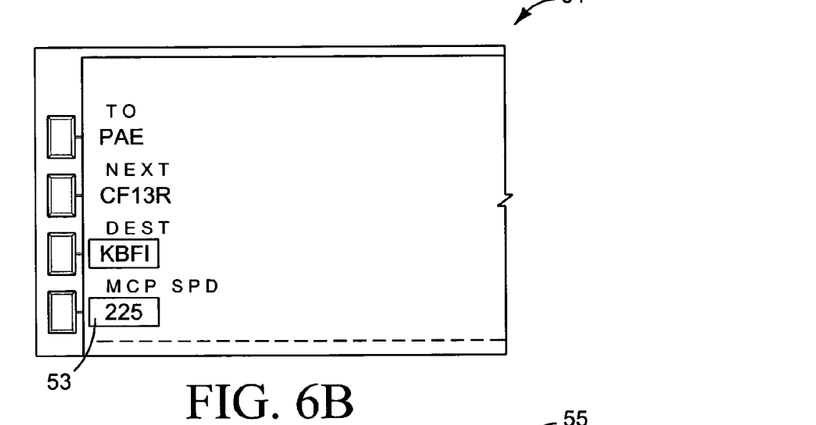
Figure 6C:
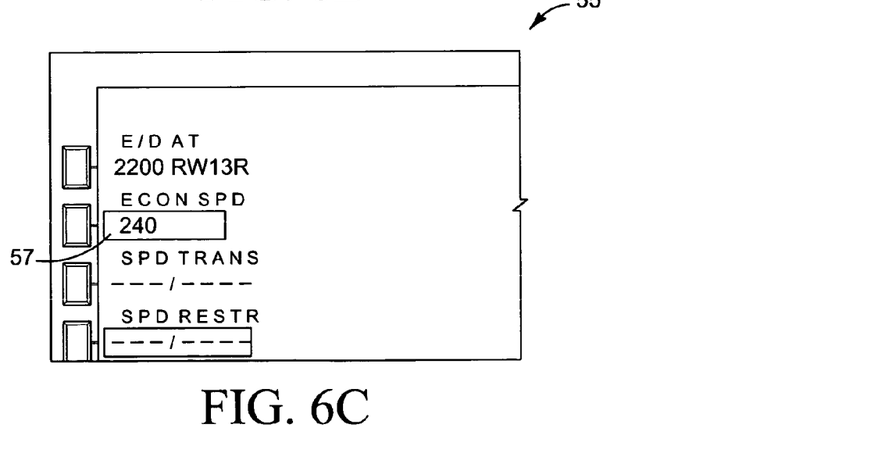
Figure 7A:
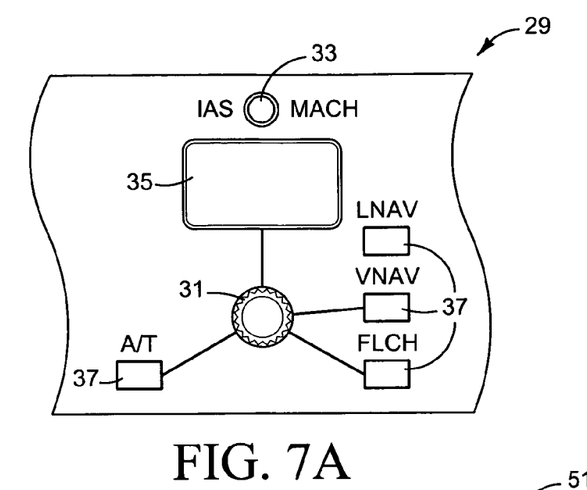
FIGS. 7A to 7C illustrate a speed section of a mode control panel after a pilot has exited intervention mode, and associated screen shots of a progress page and VNAV page, according to one embodiment of the present application.

FIG. 6B illustrates a screen shot of a progress page 51, which may be monitored by the pilot, showing the target speed to which the flight management computer 11 is controlling the aircraft in the MCP SPD window 53. FIG. 6C illustrates a screen shot of a VNAV page 55, which may be monitored by the pilot, showing the scheduled profile speed according to the preprogrammed speed profile in the ECON SPD window 57. As illustrated in FIGS. 6B and 6C, once the pilot intervenes, the flight management computer 11 controls the aircraft according to the manually set target speed of 225 knots, as displayed in MCP SPD window 53, while the scheduled profile speed remains at 240 knots, as displayed in ECON SPD window 57.

Referring again to FIG. 5, at point y along portion f' of the speed profile, ATC clears the aircraft for final approach, and the pilot wishes to return to the preprogrammed speed profile in preparation for landing. At this point, the pilot may press speed knob/selection button 31 a second time, exiting the speed intervention mode of operation, as indicated by the blank window 35 in FIG. 7A. Flight management computer 11 receives an input indicating that the pilot desires to transition from the manually set target speed to the preprogrammed speed profile and engages speed transition module 27 for transitioning the aircraft to the preprogrammed speed profile.

Employing the speed transition module 27 illustrated by the embodiment of FIG. 4, speed transition module 27 determines that the aircraft is in a descent segment of the flight profile in decision block 41. The condition of decision block 45 is selected, which determines that the manually set target speed of 225 knots is less than the scheduled profile speed of 240 knots, and therefore, the manually set target speed satisfies the selected condition for qualifying as a constraint speed.

Figure 7B:
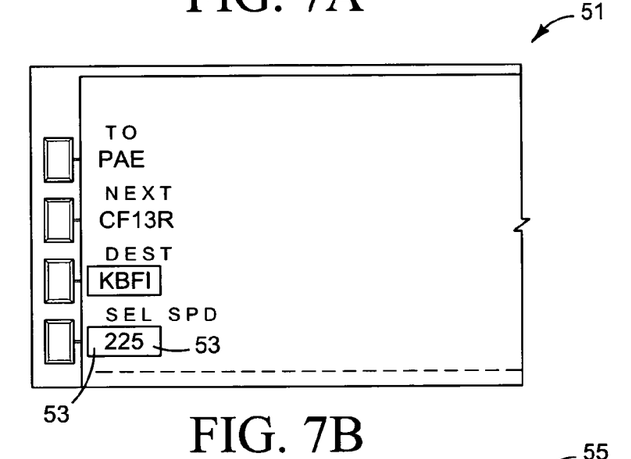
Figure 7C:
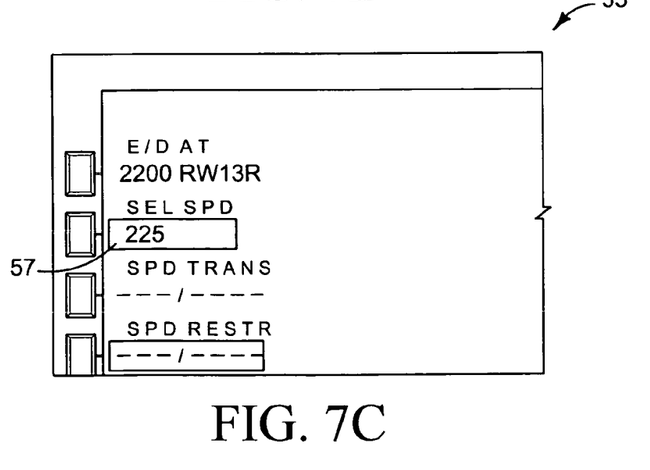

FIGS. 7B and 7C illustrate screen shots of progress page 51 and VNAV page 55, after speed transition module 27 determines the manually set target speed qualifies as a constraint speed. As shown in FIGS. 7B and 7C, the progress page 51 and VNAV page 55 now both show speed windows 53 and 57 are labeled "SEL SPD," and have been updated to display the manually set target speed of 225 knots, indicating that the preprogrammed speed profile has been updated to include the manually set target speed as a constraint speed.

As shown in the embodiment of FIG. 5, the aircraft continues flying at the updated constraint speed of 225 knots from point y to point z. At this point, the 225 knot constraint speed no longer satisfies the selected condition for qualifying as a constraint speed, since the manually set target speed of 225 knots is no longer less than the scheduled profile speed in the preprogrammed speed profile. The aircraft then begins to decelerate along the remaining portion g of the preprogrammed speed profile.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A method for controlling the speed of an aircraft having a preprogrammed speed profile when transitioning from a manually set target speed to the preprogrammed speed profile, the method comprising:

receiving an input indicating that a user desires to transition from a manually set target speed to the preprogrammed speed profile;

determining whether the manually set target speed satisfies one or more selected conditions for qualifying as a constraint speed of the preprogrammed speed profile; and     if the manually set target speed satisfies the one or more selected conditions, updating the preprogrammed speed profile to include the manually set target speed as a constraint speed and controlling the speed of the aircraft using the updated speed profile.

2. The method of claim 1, wherein determining whether the manually set target speed meets the one or more selected conditions comprises:
  determining if the aircraft is in a climb segment or descent segment;
  determining a scheduled profile speed of the aircraft according to the preprogrammed speed profile; and
  if the aircraft is in a climb segment or a descent segment, determining whether the manually set target speed provides a more optimum constraint speed than the scheduled profile speed.

3. The method of claim 2, further comprising controlling the speed of the aircraft using the preprogrammed speed profile if the manually set target speed fails to meet the one or more selected conditions for qualifying as a constraint speed.

4. The method of claim 2, wherein the manually set target speed provides a more optimum constraint speed than the scheduled profile speed if it requires less acceleration or deceleration, uses less fuel, or provides a safer speed profile than the scheduled profile speed.

5. The method of claim 1, wherein the manually set target speed meets the one or more conditions for qualifying as a constraint speed if the aircraft is in a climb segment, and the manually set target speed is greater than a scheduled profile speed of the preprogrammed speed profile.

6. The method of claim 1, wherein the manually set target speed meets the one or more conditions for qualifying as a constraint speed if the aircraft is in a descent segment, and the manually set target speed is less than a scheduled profile speed of the preprogrammed speed profile.

7. The method of claim 1, wherein the constraint speeds of the preprogrammed speed profile are selected to comply with law, to optimize fuel consumption during flight, to optimize flight time, or to optimize flight safety conditions.

8. A machine readable medium comprising machine readable instructions for causing a computer to perform a method for controlling the speed of an aircraft having a preprogrammed speed profile when transitioning from a manually set target speed to the preprogrammed speed profile, the method comprising:
  receiving an input indicating that a user desires to transition from a manually set target speed to the preprogrammed speed profile;
  determining whether the manually set target speed satisfies one or more selected conditions for qualifying as a constraint speed of the preprogrammed speed profile; and
  if the manually set target speed satisfies the one or more selected conditions, updating the preprogrammed speed profile to include the manually set target speed as a constraint speed and controlling the speed of the aircraft using the updated speed profile.

9. The machine readable medium of claim 8, wherein determining whether the manually set target speed meets the one or more selected conditions, comprises:
  determining if the aircraft is in a climb segment or descent segment;
  determining a scheduled profile speed of the aircraft according to the preprogrammed speed profile; and
  if the aircraft is in a climb segment or a descent segment, determining whether the manually set target speed provides a more optimum constraint speed than the scheduled profile speed.

10. The machine readable medium of claim 9, further comprising machine readable instructions for controlling the speed of the aircraft using the preprogrammed speed profile if the manually set target speed fails to meet the one or more selected conditions for qualifying as a constraint speed.

11. The machine readable medium of claim 9, wherein the manually set target speed provides a more optimum constraint speed than the scheduled profile speed if it requires less acceleration or deceleration, uses less fuel, or provides a safer speed profile than the scheduled profile speed.

12. The machine readable medium of claim 8, wherein the manually set target speed meets the one or more conditions for qualifying as a constraint speed if the aircraft is in a climb segment, and the manually set target speed is greater than a scheduled profile speed of the preprogrammed speed profile.

13. The machine readable medium of claim 8, wherein the manually set target speed meets the one or more conditions for qualifying as a constraint speed if the aircraft is in a descent segment, and the manually set target speed is less than a scheduled profile speed of the preprogrammed speed profile.

14. The machine readable medium of claim 8, wherein the constraint speeds of the preprogrammed speed profile are selected to comply with law, to optimize fuel consumption during flight, to optimize flight time, or to optimize flight safety conditions.

15. An aircraft comprising:
  an FMS mode control panel; and
  a flight management computer comprising a speed transition module for controlling the speed of an aircraft having a preprogrammed speed profile when transitioning from a manually set target speed to the preprogrammed speed profile, the speed transition module being configured to:
    receive an input indicating that a user desires to transition from a manually set target speed to the preprogrammed speed profile;
    determine whether the manually set target speed satisfies one or more selected conditions for qualifying as a constraint speed of the preprogrammed speed profile; and
    if the manually set target speed satisfies the one or more selected conditions, update the preprogrammed speed profile to include the manually set target speed as a constraint speed and controlling the speed of the aircraft using the updated speed profile.

16. The aircraft of claim 15, wherein the manually set target speed meets the one or more conditions for qualifying as a constraint speed if the aircraft is in a climb segment, and the manually set target speed is greater than a scheduled profile speed of the preprogrammed speed profile.

17. The aircraft of claim 15, wherein the manually set target speed meets the one or more conditions for qualifying as a constraint speed if the aircraft is in a descent segment, and the manually set target speed is less than a scheduled profile speed of the preprogrammed speed profile.

18. The aircraft of claim 15, wherein the FMS mode control panel comprises a direction section, an altitude section, a speed section and a vertical path section.

19. The aircraft of claim 15, wherein the FMS mode control panel comprises a speed knob/selection button.

20. The aircraft of claim 19, further comprising a speed intervention module which is engaged when a user presses the speed knob/selection button a first time.

21. The aircraft of claim 20, wherein the speed transition module is engaged when a user presses the speed knob/selection button a second time.

22. The aircraft of claim 15, wherein the speed transition module comprises a combination of hardware, software and/or firmware.

* * * * *